(12) United States Patent
Schroeder (10) Patent No.: US 12,262,656 B2
(45) Date of Patent: Apr. 1, 2025

(54) SYSTEM AND METHOD FOR DETECTING MATERIAL ACCUMULATION RELATIVE TO BASKET ASSEMBLIES OF AN AGRICULTURAL IMPLEMENT

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 839 days.

(21) Appl. No.: 17/215,190

(22) Filed: Mar. 29, 2021

(65) Prior Publication Data

US 2022/0308254 A1    Sep. 29, 2022

(51) Int. Cl.
*A01B 71/08*   (2006.01)
*A01B 29/04*   (2006.01)
*A01B 49/02*   (2006.01)
*G01V 9/00*    (2006.01)

(52) U.S. Cl.
CPC ............ *A01B 71/08* (2013.01); *A01B 29/048* (2013.01); *G01V 9/00* (2013.01); *A01B 49/027* (2013.01)

(58) Field of Classification Search
CPC .................................................... A01B 71/08
See application file for complete search history.

(56) References Cited

U.S. PATENT DOCUMENTS

| | | | |
|---|---|---|---|
| 9,485,900 B2 | 11/2016 | Connell et al. | |
| 10,412,876 B2 | 9/2019 | Sudbrink et al. | |
| 10,412,878 B2 | 9/2019 | Karstens et al. | |
| 10,729,068 B2 | 8/2020 | Wu et al. | |
| 2018/0206393 A1 | 7/2018 | Stoller et al. | |
| 2020/0045869 A1* | 2/2020 | Stanhope | A01C 7/205 |
| 2020/0100419 A1 | 4/2020 | Stanhope | |
| 2020/0107490 A1 | 4/2020 | Zemenchik | |
| 2021/0045278 A1* | 2/2021 | Henry | A01B 9/003 |
| 2021/0131856 A1* | 5/2021 | Henry | G01G 19/52 |
| 2021/0179103 A1* | 6/2021 | Kowalchuk | B60W 50/14 |

FOREIGN PATENT DOCUMENTS

| | | |
|---|---|---|
| DE | 102013222150 | 4/2015 |
| EP | 3815481 A1 | 5/2021 |

OTHER PUBLICATIONS

European Search Report Corresponding to Application No. 22164689 on Sep. 7, 2022.

* cited by examiner

*Primary Examiner* — Imran K Mustafa (74) *Attorney, Agent, or Firm* — Rebecca Henkel; Peter K. Zacharias; Rickard DeMille (57) ABSTRACT

A system for detecting material accumulation relative to basket assemblies of an agricultural implement includes a frame assembly, and a basket assembly configured to be supported by the frame assembly relative to a surface of a field. The system also includes a load sensor configured to detect a load indicative of a draft load associated with the basket assembly, and a computing system communicatively coupled to the load sensor. The computing system is configured to monitor the load based on data provided by the load sensor, compare the monitored load to a load threshold, and determine that field materials have accumulated relative to the basket assembly when the monitored load differs from the load threshold.

16 Claims, 6 Drawing Sheets

SYSTEM AND METHOD FOR DETECTING MATERIAL ACCUMULATION RELATIVE TO BASKET ASSEMBLIES OF AN AGRICULTURAL IMPLEMENT

FIELD OF THE INVENTION

The present disclosure generally relates to agricultural implements and, more particularly, to systems and methods for detecting material accumulation relative to rolling basket assemblies of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow discs, leveling discs, rolling baskets, shanks, tines, and/or the like. Such ground engaging tool(s) loosen, agitate, and/or otherwise work the soil to prepare the field for subsequent planting operations.

During tillage operations, field materials, such as residue, soil, rocks, mud, and/or the like, may become trapped or otherwise accumulate on and/or within ground engaging tools or between adjacent ground engaging tools. For instance, material accumulation will often occur around the exterior of a basket assembly (e.g., on the blades or bars of the basket assembly) and/or within the interior of the basket assembly. Such accumulation of field materials may prevent the basket assembly from performing in a desired manner during the performance of a tillage operation. In such instances, it is often necessary for the operator to take certain corrective actions to remove the material accumulation. However, it is typically difficult for the operator to detect or determine a plugged condition of a basket assembly when viewing the tools from the operator's cab.

Accordingly, systems and methods for detecting material accumulation relative to basket assemblies of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting material accumulation relative to basket assemblies of an agricultural implement. The system includes a frame assembly, and a basket assembly configured to be supported by the frame assembly relative to a surface of a field. The system also includes a load sensor configured to detect a load indicative of a draft load associated with the basket assembly, and a computing system communicatively coupled to the load sensor. The computing system is configured to monitor the load based on data provided by the load sensor, compare the monitored load to a load threshold, and determine that field materials have accumulated relative to the basket assembly when the monitored load differs from the load threshold.

In another aspect, the present subject matter is directed to an agricultural implement includes a main frame assembly and a sub-frame assembly configured to support a plurality of finishing tools relative to the main frame assembly, with the plurality of finishing tools including a basket assembly. The implement also includes a basket actuator pivotably coupled to a first component of the sub-frame assembly at a first pivot joint and to a second component of the sub-frame assembly at a second pivot joint, with the basket actuator being configured to apply a down pressure on the basket assembly. Additionally, the implement includes a load sensor configured to detect a load applied through one of the first pivot joint or the second pivot joint, and a computing system communicatively coupled to the load sensor. The computing system is configured to monitor the load associated based on data provided by the load sensor, compare the monitored load to a load threshold, and determine that field materials have accumulated relative to the basket assembly when the monitored load differs from the load threshold.

In a further aspect, the present subject matter is directed to a method for detecting material accumulation relative to basket assemblies of an agricultural implement, with the agricultural implement including a frame assembly and a basket assembly configured to be supported by the frame assembly relative to a surface of a field. The method includes monitoring, with a computing system, a load indicative of a draft load associated with the basket assembly, comparing, with the computing system, the monitored load to a load threshold. In addition, the method includes determining, with the computing system, that field materials have accumulated relative to the basket assembly when the monitored load differs from the load threshold, and automatically initiating, with the computing system, a control action in response to determining that field materials have accumulated relative to the basket assembly.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for detecting material accumulation relative to basket assemblies of an agricultural implement. In several embodiments, a computing system may be configured to monitor a load applied through a frame assembly supporting a given basket assembly to determine or infer when the basket assembly is plugged or is otherwise experiencing plug-related conditions. Specifically, the monitored load may be compared to an applicable load threshold and, when the monitored load differs from the threshold (e.g., by exceeding the threshold), the computing system may determine or infer that the corresponding basket assembly is plugged. Upon making such a determination, the computing system may be configured to automatically initiate a control action, such as by generating an operator notification and/or automatically adjusting the operation of the implement (including adjusting one or more operating parameters associated with the tools of the implement).

Figure 1:
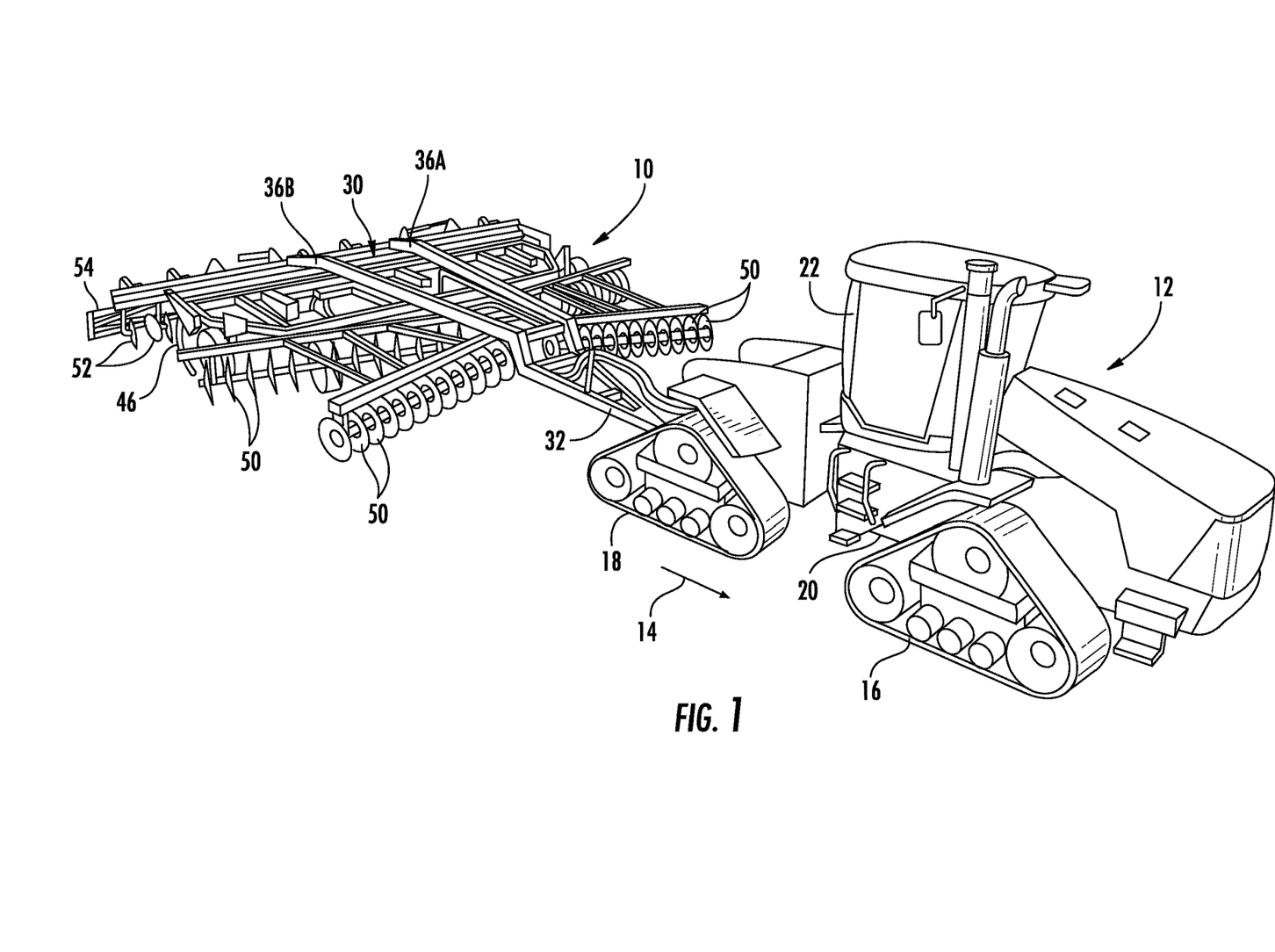
FIG. 1 illustrates a perspective view of one embodiment of an agricultural implement coupled to a work vehicle in accordance with aspects of the present subject matter.
Figure 2:
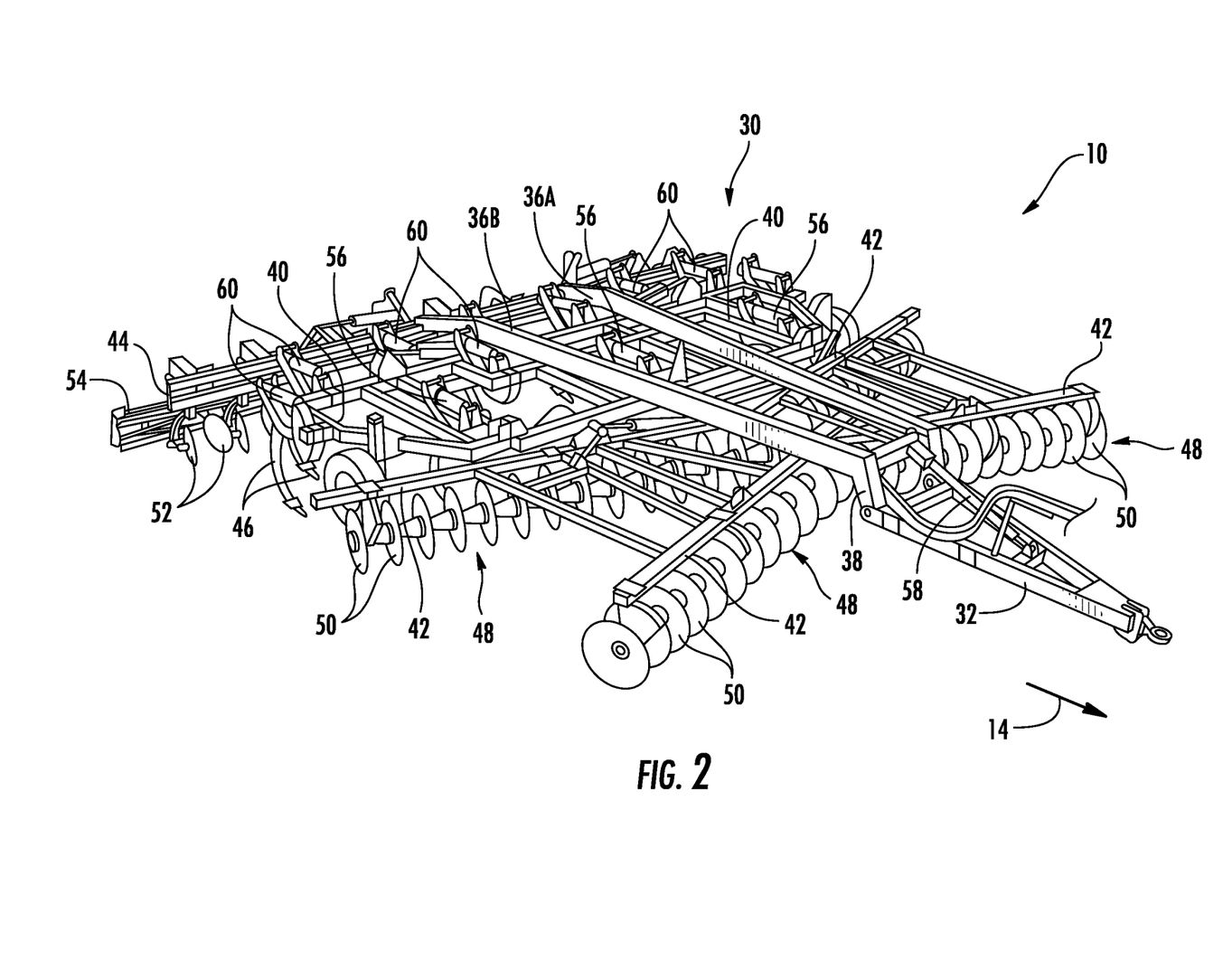
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. Alternatively, the track assemblies 16, 18 can be replaced with tires or other suitable traction members. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include various drive components (not shown), such as an engine and a transmission mounted on the chassis 20. The transmission may be operably coupled to the engine and may provide variably adjusted gear ratios for transferring engine power to the track assemblies 16, 18 via a drive axle assembly (not shown) (or via axles if multiple drive axles are employed).

Moreover, as shown in FIGS. 1 and 2, the implement 10 may generally include a carriage or main frame assembly 30 configured to be towed by the work vehicle via a pull hitch or tow bar 32 in the direction of travel 14 of the vehicle 12. As is generally understood, the main frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 10 is being towed.

As particularly shown in FIG. 2, the main frame assembly 30 may include a pair of longitudinally extending, laterally spaced carrier frame members coupled to the tow bar 32 (e.g., a left-side carriage frame member 36A and a right-side carriage frame member 36B). In addition, reinforcing gusset plates 38 may be used to strengthen the connection between the tow bar 32 and the carrier frame members 36A, 38B. In several embodiments, the main frame assembly 30 may generally function to support a plurality of sub-frame assemblies of the implement 10, such as a central sub-frame assembly 40, a forward sub-frame assembly 42 positioned forward of the central sub-frame assembly 40 in the direction of travel 14 of the work vehicle 12, and an aft sub-frame assembly 44 positioned aft of the central sub-frame assembly 40 in the direction of travel 14 of the work vehicle 12. Each sub-frame assembly may generally include a plurality of structural frame members, such as beams, bars (including toolbars), and/or the like, configured to support or couple to a plurality of components.

As shown in FIG. 2, in one embodiment, the central sub-frame assembly 40 may correspond to a shank frame configured to support a plurality of ground-engaging shanks 46. In such an embodiment, the shanks 46 may be configured to till the soil as the implement 10 is towed across the field. However, in other embodiments, the central sub-frame assembly 40 may be configured to support any other suitable ground-engaging tools, such as disks and harrows.

Additionally, as shown in FIG. 2, in one embodiment, the forward sub-frame assembly 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 14 of the work vehicle 12 to promote more effective tilling of the soil. However, in other embodiments, the forward sub-frame assembly 42 may be configured to support any other suitable ground-engaging tools.

Moreover, similar to the central and forward sub-frame assembly 40, 42, the aft sub-frame assembly 44 may also be configured to support a plurality of ground-engaging tools. For instance, in the illustrated embodiment, the aft frame is configured to support a plurality of finishing tools, such as a plurality of leveling blades 52 and rolling (or crumbler)

basket assemblies 54. However, in other embodiments, any other suitable ground-engaging tools may be coupled to and supported by the aft sub-frame assembly 44, such as a plurality of closing disks.

In addition, the implement 10 may also include any number of suitable actuators (e.g., hydraulic cylinders) for adjusting the relative positioning, penetration depth, and/or down force associated with the various ground-engaging tools 46, 50, 52, 54. For instance, as shown in FIG. 2, the implement 10 may include one or more first actuators 56 coupled to the central sub-frame assembly 40 for raising or lowering the central sub-frame assembly 40 relative to the ground, thereby allowing the penetration depth and/or the down pressure of the shanks 46 to be adjusted. Similarly, the implement 10 may include one or more second actuators 58 coupled to the forward sub-frame assembly 42 to adjust the penetration depth and/or the down pressure of the disk blades 50. Moreover, the implement 10 may include one or more third actuators 60 coupled to the aft sub-frame assembly 44 to allow the aft sub-frame assembly 44 to be moved relative to the carriage frame members 36A, 36B and/or the central sub-frame assembly 40, thereby allowing the relevant operating parameters of the finishing tools 52, 54 supported by the aft sub-frame assembly 44 (e.g., the down pressure and/or the penetration depth) to be adjusted.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
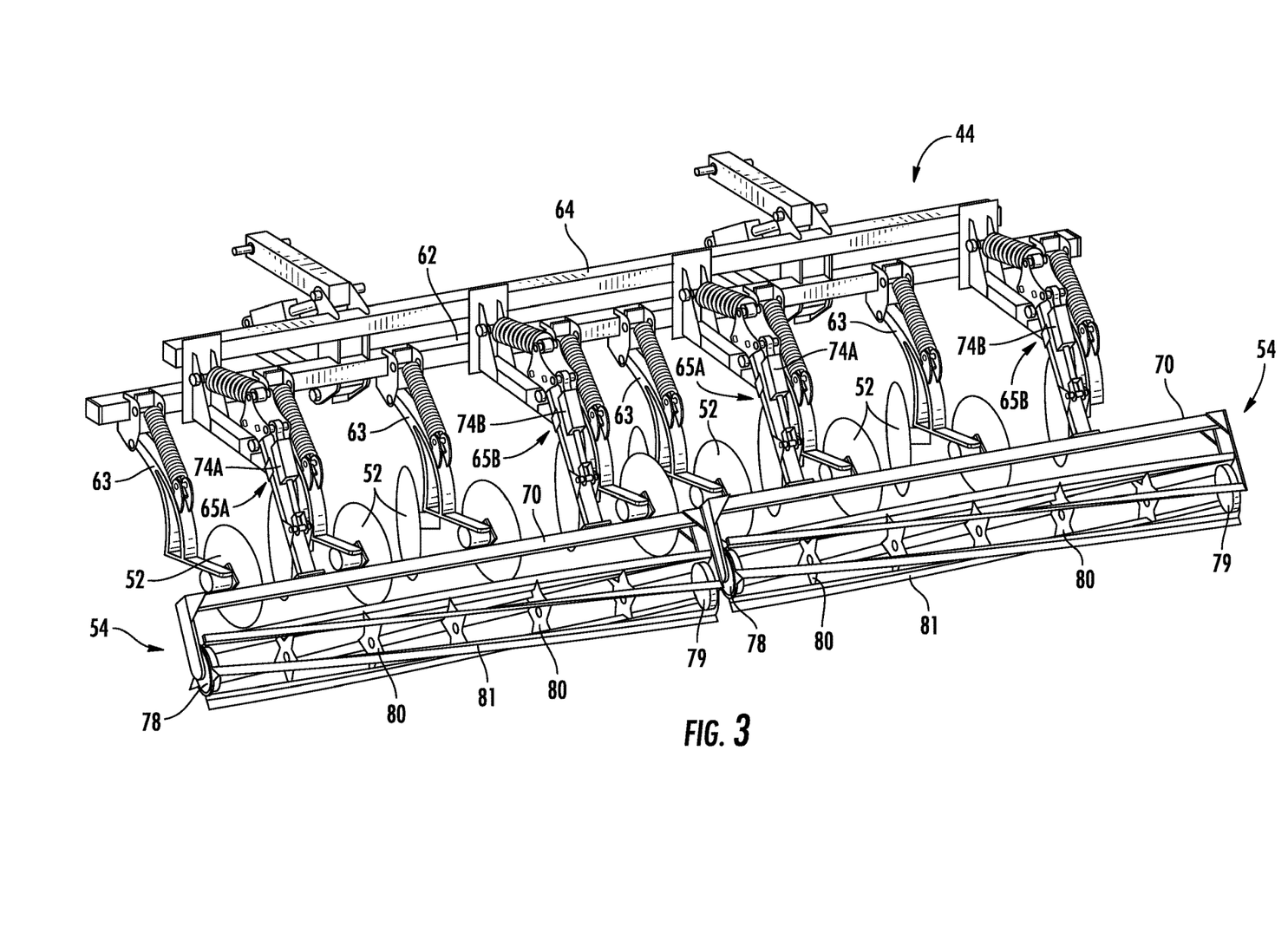
FIG. 3 illustrates a perspective view of an aft portion of the agricultural implement shown in FIGS. 1 and 2 in accordance with aspects of the present subject matter, particularly illustrating an aft sub-frame assembly and associated finishing tools of the agricultural implement.
Figure 4:
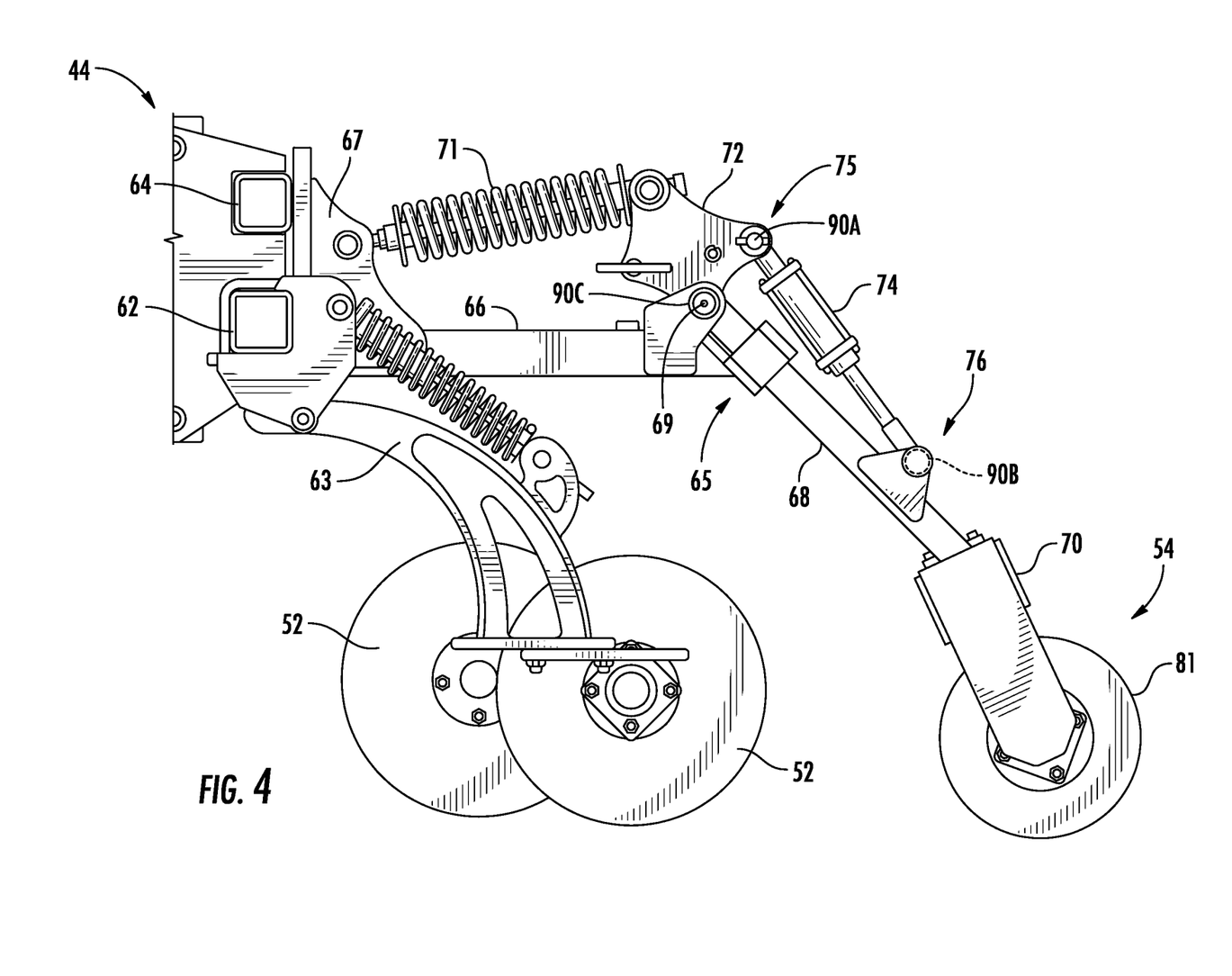
FIG. 4 illustrates a side view of the various components of the implement shown in FIG. 3.

Referring now to FIGS. 3 and 4, differing views of an aft portion of the agricultural implement 10 shown in FIGS. 1 and 2 is illustrated in accordance with aspects of the present subject matter. Specifically, FIG. 3 illustrates a perspective view of the aft sub-frame assembly 44 and associated finishing tools 52, 54 of the agricultural implement 10. Additionally, FIG. 4 illustrates a side view of the various components shown in FIG. 3.

As shown in FIGS. 3 and 4, the aft sub-frame assembly 44 may include a plurality of frame components configured to support the finishing tools 52, 54 relative to both the main frame assembly 30 (FIGS. 1 and 2) and the surface of the field. For instance, the aft sub-frame assembly 44 includes a laterally extending blade toolbar 62 and a plurality of blade support arms 63 coupled to and extending from the blade toolbar 62, with each blade support arm 63 configured to support a corresponding leveler disk 52 (or set of leveler disks 52) relative to the toolbar 62. Additionally, the aft sub-frame assembly 44 includes a laterally extending basket toolbar 64 and one or more pairs of basket support arm assemblies 65 coupled to and extending from the basket toolbar 64, with each pair of basket support arms assemblies 65 being configured to support a corresponding basket assembly 54 relative to the toolbar 64. For instance, as shown in FIG. 3, each basket assembly 54 may be supported by a first or left-side basket support arm assembly 65A and a second or right-side basket support arm assembly 65B. As particularly shown in FIG. 4, each basket support arm assembly 65 may include a first support arm 66 rigidly coupled to the basket toolbar 64 at one end of the arm 66 (e.g., via an associated mounting bracket 67) and pivotably coupled to a second support arm 68 of the basket support arm assembly 65 (e.g., at pivot point 69) at the opposed end of the arm 66, with the second support arm 68, in turn, being coupled to an associated mounting yoke or basket hanger 70 of the associated basket assembly 54. Additionally, as shown in FIG. 4, the aft sub-frame assembly 44 includes a biasing member (e.g., spring 71) coupled between the basket toolbar 64 (e.g., via bracket 67) and an opposed mounting bracket 72 of the assembly 44 to provide a downward biasing force against the basket assembly 54. In one embodiment, the mounting bracket 72 is pivotably coupled to the first support arm 66 (e.g., at pivot point 69) to allow the bracket 72 to pivot relative to the support arm 66.

Moreover, in several embodiments, the aft sub-frame assembly 44 includes a basket actuator 74 (e.g., a hydraulic or pneumatic cylinder) pivotably coupled between each mounting bracket 72 and each second support arm 68 to allow a fixed or variable downforce to be applied against the basket assembly 54. For instance, a first or left-side basket actuator 74A and a second or right-side basket actuator 74B may be provided in operative association with each basket assembly 54 for providing a downforce thereto. As particularly shown in FIG. 4, one end of each basket actuator 74 (e.g., the cylinder end) is pivotably coupled to the adjacent mounting bracket 72 at a first pivot joint 75 (e.g., via a bolted or pinned connection) and the opposed end of each basket actuator 74 (e.g., the rod end) is pivotably coupled to the adjacent second support arm 68 at a second pivot joint 76 (e.g., via a bolted or pinned connection). As such, by extending or retracting the basket actuator 74 between the opposed pivot joints 75, 76, the downforce applied to the basket assembly 54 can be increased or decreased, as desired.

It should be appreciated that the basket assemblies 54 may generally have any suitable configuration. For instance, as shown in FIG. 3, each basket assembly 54 includes a plurality of support plates 78, 79, 80 configured to support a plurality of blades or bars 81 spaced circumferentially about the outer perimeter of the basket, such as first and second end plates 78, 79 positioned at the opposed lateral ends of the basket assembly 54 and a plurality of inner support plates 80 spaced apart laterally from one another between the end plates 78, 79. As is generally understood, the end plates 78, 79 may be rotatably coupled to the corresponding basket hanger 70 via bearings to allow the basket assembly 54 to rotate relative to the hanger/arm 70 as the implement 10 is being moved across the field. Additionally, in the illustrated embodiment, the bars 81 of each basket assembly 54 are configured as formed bars. However, in other embodiments, the bars 81 may have any other suitable configuration, such as flat bars, round bars, angled bars, and/or the like.

As the implement 10 is moved across a field, the basket assemblies 54 may be configured to roll across the surface of the field and break-up soil clods and/or chop surface residue into smaller pieces. However, in certain instances, a plugged condition or state may occur in which field materials accumulate around the exterior of a basket assembly 54 (e.g., on the blades or bars of the basket assembly 54) and/or within the interior of the basket assembly 54. For example, when the soil in the field has high moisture content, the soil may stick or adhere to the blades or bars and/or clog-up the interior of the basket assembly 54, which generally prevents the basket assembly 54 from performing in a desired manner during the performance of a tillage operation. In this regard, the present inventor has recognized that material accumulation on and/or within a basket assembly 54 results in the draft load(s) required to pull the basket assembly 54 across the field at the desired down pressure (e.g., as applied via the basket actuator 74) to be increased. As such, by directly or indirectly monitoring the draft loads associated with a given basket assembly 54 during the performance of a tillage operation, it may be inferred or determined when the basket assembly 54 is plugged. For example, the draft loads on a basket assembly 54 generally vary as a function of the ground speed of the implement 10 and the down pressure on the basket assembly 54, and this relationship can be used to establish an expected or baseline draft load range for each basket assembly 54 at various combinations of speed/down pressure settings (e.g., via a look-up table and/or algorithm). In such an embodiment, by monitoring the load associated with a given basket assembly 54 relative to a maximum load threshold for the draft load range associated with the current ground speed and down pressure setting, it can be inferred or determined that the basket assembly 54 is plugged when the monitored draft load exceeds the maximum load threshold.

In addition to such threshold-based load monitoring (or as an alternative thereto), the monitored load associated with a given basket assembly 54 of an agricultural implement 10 may be compared to the monitored load associated with another basket assembly 54 of the implement 10 to determine or infer plugging of one of such basket assemblies 54. For example, it may generally be expected that each of the basket assemblies 54 will experience the same or similar draft loads. As such, when the monitored load of one basket assembly 54 exceeds the monitored load of another basket assembly 44 by a given load differential threshold, it may be inferred that the basket assembly 44 experiencing the increased loads is plugged.

In several embodiments, the draft load associated with each basket assembly 44 may be estimated or determined using one or more load sensors 90 provided in operative association with the aft sub-frame assembly 44. In general, the load sensor(s) 90 may correspond to any suitable sensing device or system configured to provide or generate load data indicative of the draft load associated with the corresponding basket assembly 54. For example, the load sensor(s) 90 may correspond to piezoelectric or strain gauge sensors, load cells, load pins, and/or any other suitable sensing devices.

In several embodiments, the load sensor(s) 90 may correspond to one or more load pins (e.g., multi-axis load pins) provided at one or more corresponding connection points or pivot joints associated with the aft sub-frame assembly 44. For instance, FIG. 4 illustrates three different example locations at which load pins may be provided to monitor a load indicative of the draft load associated with a given basket assembly 54. As shown in FIG. 4, in one embodiment, a load pin 90A may be provided at the pinned or bolted connection forming the first pivot joint 75 between the mounting bracket 72 of the aft sub-frame assembly 44 and the basket actuator 74 of the aft sub-frame assembly 44 (e.g., the cylinder end of the basket actuator 74). In another embodiment, as shown in FIG. 4, a load pin 90B may be provided at the pinned or bolted connection forming the second pivot joint 77 between the second support arm 68 of the aft sub-frame assembly 44 and the basket actuator 74 of the aft sub-frame assembly 44 (e.g., the rod end of the basket actuator 74). In yet another embodiment, a load pin 90C may be provided at the pinned or bolted connection forming the pivot point 69 for pivotably coupling the first support arm 66 to the mounting bracket 72 and the second support arm 68 of the aft sub-frame assembly 44. In further embodiments, the load sensor(s) 90 may correspond to any other suitable sensing device or system and/or may be provided in operative association with any other suitable component (e.g., any other suitable component of the aft sub-frame assembly 44) so as to provide load data indicative of the draft load associated with a given basket assembly 44.

As will be described below, in addition to detecting material accumulation relative to a given basket assembly 54, the disclosed load sensors 90 may also allow for the location of the material accumulation to be estimated or inferred. For instance, by providing a load sensor 90 in association with each of the left-side and right-side basket actuators 74A, 74B (e.g., load sensors 90A or 90B) and/or with each of the left-side and right side basket support arm assemblies 65A, 65B, the loads transmitted through such components can be monitored and compared to determine if the loads associated with one side of the basket assembly 54 (e.g., a left-half of the basket assembly 54) are greater than the loads associated with other side of the basket assembly 54 (e.g., a right-half of the basket assembly 54). If a load differential is detected, it may be inferred that the side experiencing the higher load is plugged (or plugged to a greater extent than the other side).

Figure 5:
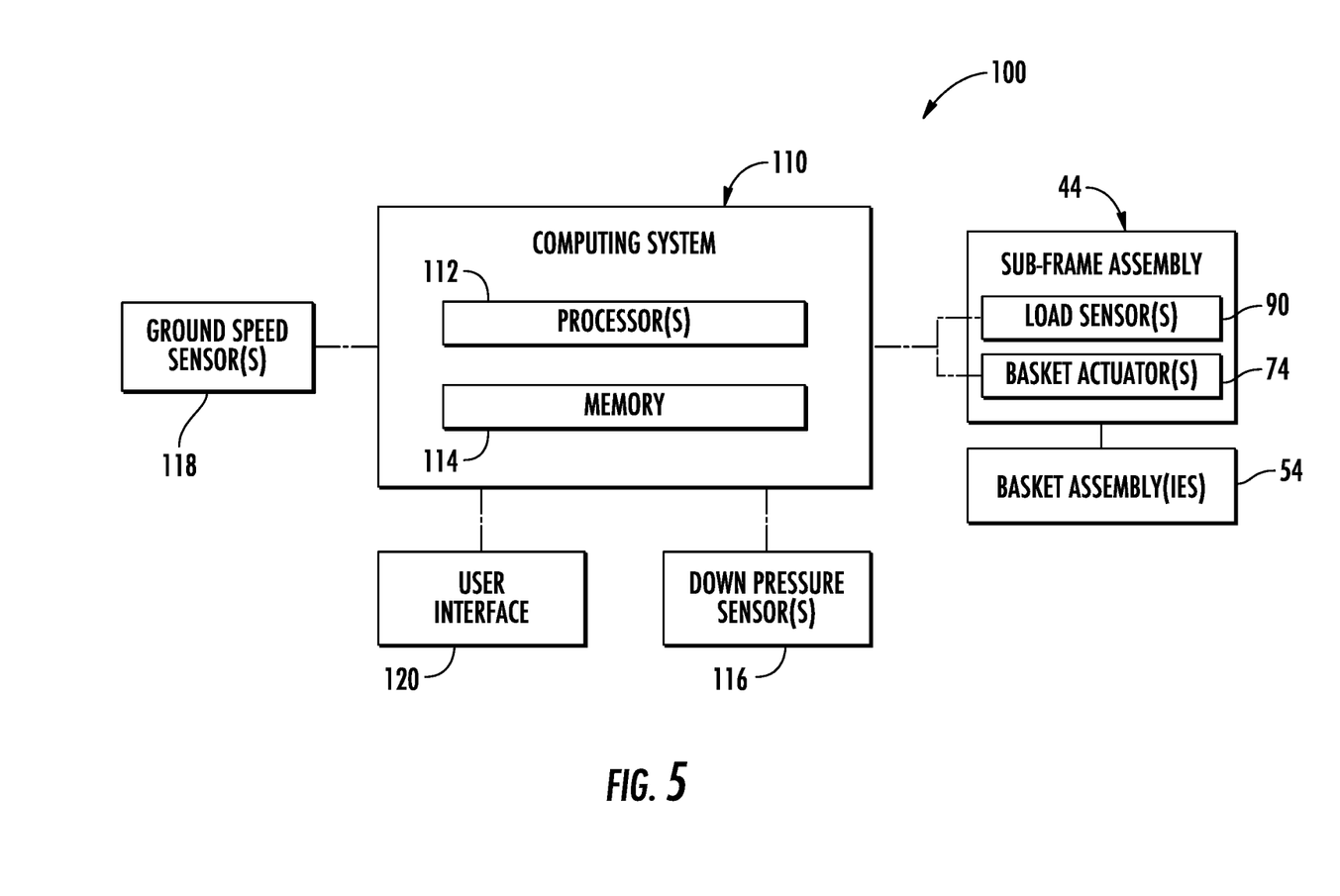
FIG. 5 illustrates a schematic view of one embodiment of a system for detecting material accumulation relative to basket assemblies of an agricultural implement in accordance with aspects of the present subject matter.

Referring now to FIG. 5, a schematic view of one embodiment of a system 100 for detecting material accumulation relative to basket assemblies of an agricultural implement is illustrated in accordance with aspects of the present subject matter. In general, the system 100 will be described herein with reference to the implement 10, aft sub-frame assembly 44, and related basket assemblies 54 described above with reference to FIGS. 1-4. However, it should be appreciated by those of ordinary skill in the art that the disclosed system 100 may generally be utilized with agricultural implements having any other suitable implement configuration, frame assemblies having any other suitable frame configuration, and/or with basket assemblies having any other suitable basket configuration.

In general, the system 100 may include one or more components of an agricultural implement, such as one or more of the components of the implement 10 described above. For example, as shown in FIG. 5, the system 100 may include a sub-frame assembly (e.g., the aft sub-frame assembly 44 of the implement 10) and one or more basket assemblies (e.g., the basket assemblies 54 of the implement 10) configured to be supported by the sub-frame assembly 44 relative to the ground. The sub-frame assembly 44 may also include one or more basket actuators 74 (e.g., two actuators 74A, 74B per basket assembly 54) for adjusting the down pressure applied to the basket assemblies 54. Additionally, as shown in FIG. 5, the sub-frame assembly 44 may generally be provided in operative association with one or more load sensors (e.g., the load sensors 90 described above) configured to detect a load indicative of the draft load associated with each basket assembly 54. For instance, as described above, load pins 90A, 90B may be provided at the pinned or bolted connection forming one or both of the pivot joints 75, 76 between each basket actuator 74 and an adjacent component of the aft sub-frame assembly 44 (e.g., the mounting bracket 72 and/or the second support arm 68 of the aft sub-frame assembly 44). In another embodiment, a load pin 90C may be provided at the pinned or bolted connection forming the pivot point 69 for pivotably coupling the first support arm 66 of the sub-frame assembly 44 to the mounting bracket 72 and the second support arm 68 of the sub-frame assembly 44.

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the loads applied through the aft sub-frame assembly 44 relative to an associated load threshold. Specifically, in one embodiment, the computing system 110 may be communicatively coupled to the load sensor(s) 90 provided in association with the aft sub-frame assembly 44 (e.g., via a wired or wireless connection) to allow the load(s) applied through such assembly 44 to be monitored, thereby providing an indication of the draft load(s) associated with the basket assemblies 54. The monitored load may then be compared to an associated load threshold selected based on the current ground speed of the implement 10 and the current down pressure setting of a corresponding basket assembly 54 to determine or infer the "plugging" status of the basket assembly 54.

For example, in one embodiment, the load threshold may correspond to a maximum load threshold for a load range selected based on the anticipated or expected draft load range for the basket assembly 54 given the current ground speed of the implement 10 and the current down pressure setting of the assembly 54. In such an embodiment, the computing system 110 may be configured to determine or infer that the corresponding basket assembly 54 is in a non-plugged state when the monitored load is at or below the load threshold and that the basket assembly 54 is in a plugged state when the monitored load exceeds the load threshold. In another embodiment, the load threshold may correspond to a differential threshold value associated with an anticipated or expected load differential between two basket assemblies 54 (e.g., given the current ground speed of the implement 10 and the current down pressure settings of the basket assemblies 54). In such an embodiment, the computing system 110 may be configured to determine or infer that the basket assembly 54 experiencing the highest loads is in a plugged state when the load differential between the two basket assemblies 54 exceeds the associated load differential threshold.

As indicated above, the load threshold selected for evaluating the plugging status of a basket assembly 54 may generally vary as a function of ground speed and basket down pressure. Thus, in several embodiments, the computing system 110 may be configured to calculate or select an applicable load threshold value based on the current ground speed of the implement 10 and the current down pressure setting for the basket assemblies 54. To account for variations in the ground speed and/or the down pressure, the computing system 110 may be configured to utilize one or more look-up tables and/or mathematical relationships to select an appropriate loading threshold. For instance, in one embodiment, the computing system 110 may include a look-up table or mathematical relationship that correlates threshold values for the load threshold to the ground speed of the implement 10, thereby allowing the computing system 110 to select an initial threshold value based on the current ground speed of the implement 10. Such initial threshold value may then be adjusted or corrected (e.g., up or down), as necessary, based on the current down pressure setting for the basket assemblies 54 (e.g., by scaling or adjusting the initial value based on a known relationship between the down pressure and the threshold values). In another embodiment, the computing system 110 may include a plurality of ground-speed-dependent look-up tables or mathematical relationships (e.g., one for each of a plurality of different ground speeds) that correlates threshold values for the loading threshold to down pressures for the basket assemblies at each ground speed, thereby allowing the computing system 110 to select an appropriate threshold value as a function of the down pressure and ground speed. In such an embodiment, the computing system 110 may be configured to use suitable interpolation techniques to calculate a threshold value when the current ground speed is between two reference ground speeds for which look-up tables and/or mathematical expressions are stored within the computing system's memory 114.

Referring still to FIG. 5, to select the applicable loading threshold, the computing system 110 may generally be configured to receive an input associated with the current down pressure for the basket assemblies 54. In one embodiment, this input may be received from the operator. For instance, the operator may select or input the desired or current down pressure setting via a user interface 120 provided within the cab 22 of the work vehicle 12. Alternatively, the computing system 110 may be configured to actively monitor the current down pressure being applied to the basket assemblies 54 via sensor feedback provided by one or more down pressure sensors 116. For example, in one embodiment, each down pressure sensor 116 may correspond to a pressure sensor provided in operative association with a corresponding basket actuator 74 of the implement 10. In such an embodiment, the sensor(s) may be configured to monitor the fluid pressure(s) associated with the basket actuator 74, thereby providing an indication of the down pressure applied to the associated basket assembly 54. In another embodiment, the disclosed load sensors 90 may perform a dual function by providing data associated with both the draft load of the basket assemblies 54 and the down pressure applied thereto. For instance, when the load sensors comprises multi-axis load pins 90B provided at the pinned or bolted connections forming the second pivot joint 77 between each second support arm 68 of the aft sub-frame assembly 44 and the adjacent basket actuator 74, the data from the load pin 90B may be used to monitor both the draft load and the down pressure associated with the corresponding basket assembly 54. In even further embodiments, the computing system 110 may be communicatively coupled to any other suitable down pressure sensor(s) or feedback device(s) that allows the computing system 110 to directly or indirectly monitor/infer the down pressure applied to the basket assemblies 54.

Additionally, as shown in FIG. 5, to allow the computing system 110 to monitor the ground speed of the implement 10, the computing system 110 may be communicatively coupled to one or more ground speed sensors 118. In general, the ground speed sensor(s) 118 may correspond to any suitable sensing device or system that is configured to provide data indicative of the ground speed of the implement 10. For instance, in one embodiment, the ground speed sensor 118 may correspond to a GPS device or any other suitable satellite navigation position system configured to generate data associated with the ground speed of the implement 10. In another embodiment, the ground speed sensor(s) 118 may correspond to a rotary speed sensor(s) configured to monitor the rotational speed of a given component that provides an indication of the ground speed of the implement 10, such as the engine or transmission of the work vehicle 12 or a wheel of the vehicle 12 or implement 10.

As indicated above, the computing system 110 may be configured to determine or infer the "plugging" status of one or more basket assemblies by comparing the load(s) applied through the aft sub-frame assembly 44 to an associated loading threshold. Additionally, when it is determined that a given basket assembly 54 is plugged or otherwise in a plugged state (e.g., a partially or fully plugged state), the computing system 100 may, in several embodiments, be further configured to determine or infer the location of material accumulation relative to the basket assembly 54. Specifically, in embodiments in which load sensors 90 are provided in association with laterally spaced frame components that support a given basket assembly 54, the computing system 110 may be configured to monitor the loads applied through the frame components to determine if a load imbalance exists across the aft sub-frame assembly 44 at such laterally spaced apart locations. For instance, as described above with reference to FIGS. 3 and 4, in an embodiment in which a load sensor 90 is provided in association with each of the left-side and right-side basket actuators 74A, 74B (e.g., load sensors 90A or 90B) and/or with each of the left-side and right side basket support arm assemblies 65A, 65B, the computing system 110 may be configured to monitor the loads transmitted through such components to determine if the loads associated with one side of the basket assembly 54 (e.g., a left-half of the basket assembly 54) are greater than the loads associated with other side of the basket assembly 54 (e.g., a right-half of the basket assembly 54). If a load differential is detected, the computing system 110 may infer that the side experiencing the higher load is plugged (or plugged to a greater extent than the other side). As such, the computing system 110 may estimate or determine the location of material accumulation relative to a plugged basket assembly 54

Moreover, when it is determined that a given basket assembly 54 is plugged or otherwise in a plugged state (e.g., a partially or fully plugged state), the computing system 110 may also be configured to automatically initiate one or more control actions. For example, the computing system 110 may be configured to provide the operator with a notification that one or more basket assemblies 54 are in a plugged state. Specifically, in one embodiment, the computing system 110 may be communicatively coupled to the user interface 120 of the work vehicle 12 via a wired or wireless connection to allow notification signals to be transmitted from the computing system 110 to the user interface 120. In such an embodiment, the notification signals may cause the user interface 120 to present a notification to the operator (e.g., by causing a visual or audible notification or indicator to be presented to the operator) which provides an indication that one or more of the basket assemblies 54 are in a plugged state. In such instance, the operator may then choose to initiate any suitable corrective action he/she believes is necessary, such as adjusting the ground speed of the implement 10 adjusting the down pressure of the baskets, and/or a combination of the like.

Additionally, in several embodiments, the control action(s) executed by the computing system 110 may include automatically adjusting the operation of the implement 10 (including tool adjustments) and/or the associated work vehicle 12. For instance, in one embodiment, the computing system 110 may be configured to automatically adjust the down pressure applied to basket assemblies 54, such as by actively controlling the operation of the associated basket actuators 74. In another embodiment, the computing system 110 may be configured to automatically adjust the ground speed of the implement 10 to address plugging-related conditions, such as by actively controlling the engine and/or the transmission of the work vehicle 12.

Figure 6:
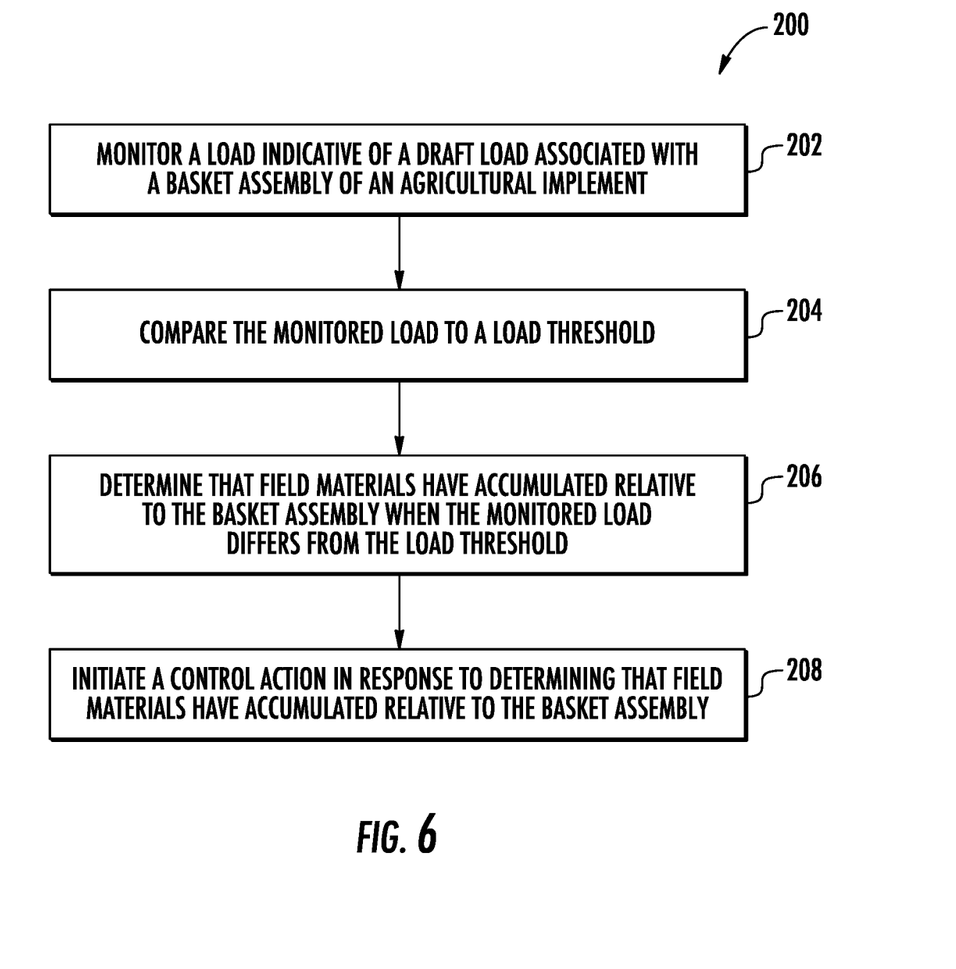
FIG. 6 illustrates a flow diagram of one embodiment of a method for detecting material accumulation relative to basket assemblies of an agricultural implement in accordance with aspects of the present subject matter.

Referring now to FIG. 6, a flow diagram of one embodiment of a method 200 for detecting material accumulation relative to basket assemblies of an agricultural implement is illustrated in accordance with aspects of the present subject matter. In general, the method 200 will be described herein with reference to the agricultural implement 10, sub-frame assembly 44, basket assemblies 54, and system 100 described above with reference to FIGS. 1-5. However, it should be appreciated by those of ordinary skill in the art that the disclosed method 200 may generally be utilized in association with agricultural implements having any suitable implement configuration, sub-frame assemblies having any other suitable frame configuration, basket assemblies having any other suitable basket configuration, and/or systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include monitoring a load indicative of a draft load associated with a basket assembly of an agricultural implement. For instance, as indicated above, the computing system 110 may be communicatively coupled to one or more load sensors 90 configured to generate load data indicative of a draft load associated with a given basket assembly 54, such as by monitoring the load applied through one or more components of the aft sub-frame assembly 44 supporting the basket assembly 54 relative to the ground. By receiving the data from the load sensor(s) 90, the computing system 110 may be configured to monitor the load(s) associated with such basket assembly 54.

Additionally, at (204), the method 200 may include comparing the monitored load to a load threshold. As indicated above, the computing system 110 may be configured to select a load threshold to be used for inferring or determining the state of plugging of a given basket assembly 54. In one embodiment, the load threshold may correspond to a maximum load threshold, such as a maximum load value associated with load range selected based on an anticipated or expected draft load range for a basket assembly 54 given the current ground speed of the implement 10 and the current down pressure setting for the basket assembly 54. In another embodiment, the load threshold may correspond to a differential threshold value associated with an anticipated or expected load differential between two different basket assemblies 54 given the current ground speed of the implement 10 and the current down pressure setting for the basket assemblies 54.

Moreover, at (206), the method 200 may include determining that field materials have accumulated relative to the basket assembly when the monitored load differs from the load threshold. Specifically, as indicated above, the computing system 110 may be configured to compare the monitored load to the applicable threshold and determine or infer that field materials have accumulated relative to the basket assembly 54 when the load differs from the threshold (e.g., when the monitored load exceeds an associated maximum load threshold or when the monitored load exceeds the monitored load of another basket assembly by an associated load differential threshold).

Referring still to FIG. 6, at (208), the method 200 may include initiating a control action in response to determining that field materials have accumulated relative to the basket assembly. For example, as indicated above, the computing system 110 may be configured to automatically initiate a control action when it is determined that a given basket assembly 54 is in a plugged state. For instance, in one embodiment, the computing system 100 may be configured to generate an operator notification associated with notifying the operator of the accumulation of field materials relative to the basket assembly 54. In addition to such operator notification (or as an alternative thereto), the computing system 110 may be configured to automatically adjust the operation of the implement 10, such as by reducing the ground speed of the implement 10 and/or by adjusting the down pressure applied to the basket assembly 54.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, a solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting material accumulation relative to basket assemblies of an agricultural implement, the system comprising:
 a frame assembly;
 a basket assembly configured to be supported by the frame assembly relative to a surface of a field;
 a basket actuator configured to apply a down pressure to the basket assembly;
 a load sensor configured to detect a load indicative of a draft load associated with the basket assembly; and
 a computing system communicatively coupled to the load sensor, the computing system being configured to:
 monitor the load based on data provided by the load sensor;
 select a load threshold for the monitored load based at least in part on both a ground speed of the agricultural implement and the down pressure applied to the basket assembly by the basket actuator;
 compare the monitored load to the load threshold; and
 determine that field materials have accumulated relative to the basket assembly when the monitored load differs from the load threshold.

2. The system of claim 1, wherein the load threshold comprises a maximum load threshold, the computing system being configured to determine that field materials have accumulated relative to the basket assembly when the monitored load exceeds the maximum load threshold.

3. The system of claim 1, wherein the basket assembly comprises a first basket assembly and the load sensor comprises a first load sensor, wherein the system further comprises a second basket assembly configured to be supported by the frame assembly relative to the surface of the field and a second load sensor configured to detect a load indicative of a draft load associated with the second basket assembly, the computing system being configured to monitor the loads associated with the first and second basket assemblies based on data provided by the first and second load sensors.

4. The system of claim 3, wherein the load threshold comprising a load differential threshold, the computing system being configured to determine that field materials have accumulated relative to the first basket assembly when the monitored load associated with the first basket assembly exceeds the monitored load associated with second basket assembly by the load differential threshold.

5. The system of claim 1, wherein the load sensor comprises a first load sensor configured to detect a first load indicative of a draft load associated with a first side of the basket assembly and further comprising a second load sensor configured to detect a second load indicative of a draft load associated with a second side of the basket assembly, the computing system being configured to monitor the first and second loads to determine a location of field material accumulation relative to the basket assembly.

6. The system of claim 1, wherein the computing system is further configured to automatically initiate a control action when it is determined that field materials have accumulated relative to the basket assembly.

7. The system of claim 6, wherein the control comprises at least one of generating an operator notification or automatically adjusting an operation of the agricultural implement.

8. The system of claim 1, wherein the load sensor comprises a load pin positioned at a pivot joint provided between the basket actuator and an adjacent component of the frame assembly.

9. A method for detecting material accumulation relative to basket assemblies of an agricultural implement, the agricultural implement including a frame assembly, a basket assembly configured to be supported by the frame assembly relative to a surface of a field, and a basket actuator configured to apply a down pressure to the basket assembly, the method comprising:
monitoring, with a computing system, a load indicative of a draft load associated with the basket assembly;
selecting, with the computing system, a load threshold for the monitored load based at least in part on both a ground speed of the agricultural implement and the down pressure applied to the basket assembly by the basket actuator;
comparing, with the computing system, the monitored load to the load threshold;
determining, with the computing system, that field materials have accumulated relative to the basket assembly when the monitored load differs from the load threshold; and
automatically initiating, with the computing system, a control action in response to determining that field materials have accumulated relative to the basket assembly.

10. The method of claim 9, wherein the load threshold comprises a maximum load threshold, and wherein determining that field materials have accumulated relative to the basket assembly comprises determining that field materials have accumulated relative to the basket assembly when the load exceeds the maximum load threshold.

11. The method of claim 9, wherein the basket assembly comprises a first basket assembly and the agricultural implement further comprises a second basket assembly configured to be supported by the frame assembly relative to the surface of the field, wherein monitoring the load indicative of the draft load associated with the basket assembly comprises monitoring loads indicative of the draft loads associated with each of the first and second basket assemblies.

12. The method of claim 11, wherein the load threshold comprising a load differential threshold between the first and second basket assemblies, wherein determining that field materials have accumulated relative to the basket assembly comprises determining that field materials have accumulated relative to the first basket assembly when the monitored load associated with the first basket assembly exceeds the monitored load associated with the second basket assembly by the load differential threshold.

13. The method of claim 9, wherein monitoring the load indicative of the draft load associated with the basket assembly comprising monitoring a first load indicative of a draft load associated with a first side of the basket assembly and a second load indicative of a draft load associated with a second side of the basket assembly, the method further comprising determining a location of the field material accumulation relative to the basket assembly based on the first and second loads.

14. The method of claim 9, wherein initiating the control action in response to determining that field materials have accumulated relative to the basket assembly comprises generating an operator notification associated with notifying an operator of the agricultural implement of the accumulation of field materials relative to the basket assembly.

15. The method of claim 9, wherein initiating the control action in response to determining that field materials have accumulated relative to the basket assembly comprises automatically adjusting an operation of the agricultural implement.

16. The method of claim 9, wherein monitoring the load indicative of the draft load associated with the basket assembly comprising monitoring a load applied through a pivot joint provided between the basket actuator and an adjacent component of the frame assembly.

* * * * *